United States Patent
Tschudin et al.

(10) Patent No.: US 12,247,859 B2
(45) Date of Patent: Mar. 11, 2025

(54) MAGNETICALLY INDUCTIVE FLOW METER

(71) Applicant: Endress+Hauser Flowtec AG, Reinach (CH)

(72) Inventors: Beat Tschudin, Reinach (CH); Bruno Worreth, Kiffis (FR); Thomas Bier, Riehen (CH); Steffen Weiss, Grenzach-Wyhlen (DE); Simon Mariager, Basel (CH)

(73) Assignee: Endress+Hauser Flowtec AG, Reinach (CH)

( * ) Notice: Subject to any disclaimer, the term of this patent is extended or adjusted under 35 U.S.C. 154(b) by 227 days.

(21) Appl. No.: 18/001,945

(22) PCT Filed: Jun. 14, 2021

(86) PCT No.: PCT/EP2021/065978
§ 371 (c)(1),
(2) Date: Dec. 15, 2022

(87) PCT Pub. No.: WO2021/254965
PCT Pub. Date: Dec. 23, 2021

(65) Prior Publication Data
US 2023/0236050 A1   Jul. 27, 2023

(30) Foreign Application Priority Data
Jun. 17, 2020   (DE) .................... 10 2020 116 004.6

(51) Int. Cl.
*G01F 1/58*   (2006.01)
*G01F 1/60*   (2006.01)

(52) U.S. Cl.
CPC .............. *G01F 1/588* (2013.01); *G01F 1/586* (2013.01); *G01F 1/60* (2013.01)

(58) Field of Classification Search
CPC ............ G01F 1/588; G01F 1/586; G01F 1/60
See application file for complete search history.

(56) References Cited

U.S. PATENT DOCUMENTS

| 4,214,477 A | 7/1980 | Schmoock |
| 4,774,844 A | 10/1988 | Davis |

(Continued)

FOREIGN PATENT DOCUMENTS

| CN | 109253764 A | 1/2019 |
| DE | 3037913 A1 | 4/1982 |

(Continued)

*Primary Examiner* — Jonathan M Dunlap
*Assistant Examiner* — John M Royston
(74) *Attorney, Agent, or Firm* — Mark A. Logan; Endress+Hauser (USA) Holding, Inc.

(57) ABSTRACT

A magnetically inductive flow measuring probe comprises a housing that is adapted to be exposed to the medium; two measuring electrodes arranged in a housing end section for forming a galvanic contact with the medium and for sensing a voltage induced in the flowing medium; and a means for producing a magnetic field passing through the housing end section. The means includes a coil arrangement and a field guide body. The field guide body comprises two field guide body legs connected with a coil core, extending to a front section of the housing and adapted to serve as field guide-back. Orthogonal projections of the measuring electrodes and the field guide body onto a cross sectional plane are disjoint.

11 Claims, 3 Drawing Sheets

(56) References Cited

U.S. PATENT DOCUMENTS 9,534,943 B2    1/2017   Perfetti et al.
2019/0285444 A1*   9/2019   Inagaki .................. G01F 15/00

FOREIGN PATENT DOCUMENTS

| | | | |
|---|---|---|---|
| DE | 3712948 A1 | 11/1988 | |
| DE | 3712948 C2 * | 8/1996 | ............ G01F 1/584 |
| DE | 102008035724 A1 | 2/2010 | |
| DE | 102018132600 A1 | 6/2020 | |
| EP | 0892251 A1 | 1/1999 | |

* cited by examiner

MAGNETICALLY INDUCTIVE FLOW METER

CROSS-REFERENCE TO RELATED APPLICATIONS

The present application is related to and claims the priority benefit of DPMA Patent Application No. 10 2020 116 004.6, filed on Jun. 17, 2020 and International Patent Application No. PCT/EP2021/065978, filed on Jun. 14, 2021, the entire contents of which are incorporated herein by reference.

TECHNICAL FIELD

The invention relates to a magnetically inductive flow measuring probe for insertion into an opening of a pipeline flowed through by a flowable medium and for ascertaining a flow velocity dependent, measured variable of a flowable medium.

BACKGROUND

Magnetically inductive flow measuring devices are applied for determining flow velocity and volume flow of a flowing medium in a pipeline. A magnetically inductive flow measuring device includes a measuring tube and a magnet system, which produces a magnetic field perpendicularly to the flow direction of the flowing medium. For such purpose, usually individual coils are used. In order to implement a predominantly uniform magnetic field, supplementally, pole shoes are so formed and placed that the magnetic field lines extend over the entire measuring tube cross section essentially perpendicularly to the transverse axis, or in parallel with the vertical axis of the measuring tube. A measuring electrode pair applied on the lateral surface of the measuring tube senses an electrical measurement voltage, or potential difference, present perpendicular to the flow direction and to the magnetic field, occurring, when a conductive medium flows in the flow direction in the presence of applied magnetic field. Since the registered measurement voltage depends according to Faraday's law of induction on the velocity of the flowing medium, flow velocity u and, with incorporation of a known tube cross section, volume flow $\dot{V}$ can be ascertained from the induced measurement voltage U.

In contrast with a magnetically inductive flow measuring device, which comprises a measuring tube for conveying the medium, means for producing a magnetic field passing through the measuring tube and measuring electrodes, magnetically inductive flow measuring probes are inserted with their usually circularly cylindrical housing into a lateral opening of a pipeline and secured there fluid-tightly. A measuring tube is not needed in such case. The above mentioned measuring electrodes and means for producing the magnetic field passing through the measuring tube mounted on the lateral surface of the measuring tube are absent, and are replaced by a means for producing the magnetic field in arranged the interior of the housing in the immediate vicinity of the measuring electrodes. The means for producing the magnetic field is so embodied that a symmetry axis of the magnetic field lines of the produced magnetic field intersects the front area, or the area between the measuring electrodes, perpendicularly. The state of the art contains a large number of different magnetically inductive flow measuring probes.

EP 0 892 251 A1, for example, teaches a magnetically inductive flow measuring probe having a front piece closing the housing on one end. The front piece is embodied as a spherical cap. The measuring probe an in the housing arranged means for producing a magnetic field passing through the front piece. The means includes a coil, which is set on a cylindrical coil core, which functions as a coil carrier and field guideback body. Two pin shaped measuring electrodes are secured in the front piece and are covered in the longitudinal direction of the housing by the means for producing the magnetic field. This makes it difficult in the production of the flow measuring probe to connect the measuring electrodes electrically via electrical conductors with a measuring circuit.

SUMMARY

An object of the invention is to provide a magnetically inductive flow measuring probe, which is, indeed, simple to produce, yet requires no compromises as regards measuring performance.

The magnetically inductive flow measuring probe of the invention for insertion into an opening of a pipeline flowed through by a flowable medium for ascertaining a flow velocity dependent, measured variable of a flowable medium comprises:

a housing, which is adapted to be exposed to the medium,
  wherein the housing has a housing end section,
  wherein the housing includes a housing case, which encloses a housing interior;
two measuring electrodes arranged, especially diametrically, in the housing end section for forming a galvanic contact with the medium and for sensing a voltage induced in the flowing medium,
  wherein the two measuring electrodes have, in each case, a measuring electrode contact element, which protrudes inwardly into the housing interior;
  wherein a housing longitudinal plane extends through the two measuring electrode contact elements;
a means for producing a magnetic field passing through the housing end section,
wherein the means is arranged in the housing interior,
wherein the means includes a coil arrangement and a field guide body,
wherein the coil arrangement includes an opening,
wherein the field guide body includes a coil core, which extends through the opening,
wherein the field guide body includes two field guide body legs connected with the coil core, extending to a front section of the housing and adapted to serve as field guideback,
wherein orthogonal projections of the measuring electrodes and the field guide body onto a cross sectional plane are disjoint.

By such an arrangement of the measuring electrodes relative to the field guide body, the measuring electrodes, especially the measuring electrode contact elements, remain freely accessible and are not hidden by individual components of the means for producing the magnetic field. This enables an easier assembly, i.e. simpler and faster contacting of the measuring electrode contact elements with corresponding electrical leads serving to connect the measuring electrodes with a measuring circuit. Additionally, because the field guidebacks are embodied as field guide legs, an overall more compact and slimmer means for producing the magnetic field results.

A measuring electrode contact element can be a separate component arranged on an end of a measuring electrode or be formed as the end section of the measuring electrode.

Furthermore, an assembly of this type enables the application of larger electrodes.

Advantageous embodiments of the invention are set forth in the dependent claims.

An embodiment provides that a field guide body longitudinal plane extends through the two field guide body legs, wherein the housing longitudinal plane and field guide body longitudinal plane define an angle β with 0°<β≤90°, especially 10°≤β≤60° and preferably 25°≤β≤45°.

Such an embodiment has the advantage that, in spite of the simpler assembly, still a magnetic field having a sufficiently large magnetic induction for a flow measurement is produced. The angle range of 25°≤β≤45° is especially advantageous for providing a special balance between reachability of the measuring electrode contact elements for contacting them and the strength of the magnetic induction.

An embodiment provides that the field guide body leg is, at least partially, embodied strip shaped, and/or wherein the field guide body has exactly two mutually perpendicular mirror planes, wherein one of the two mirror planes and the field guide body longitudinal plane coincide.

An embodiment provides that the coil arrangement includes a coil, a coil support and two coil contact elements, wherein the coil contact elements are connected with a coil wire wound on the coil support and forming the coil, wherein the two coil contact elements are arranged on the coil support, especially on a side far from the housing end section, wherein a coil arrangement longitudinal plane extends through the two coil contact elements, wherein a field guide body longitudinal plane extends through the two field guide body legs, wherein the field guide body longitudinal plane and the coil arrangement longitudinal plane define an angle α with 0°≤α≤90°, especially α≥50° and preferably α≥75°.

The field guide body legs extend starting from the housing front section in parallel with the coil core and then come together at an end section of the coil core, where they are mechanically connected with the coil core. A placing of the coil longitudinal plane at an angle α from the field guide body longitudinal plane leads to the technical effect that the coil contact elements are not hidden by the field guide body, especially by the field guide body legs, in the direction of the housing longitudinal axis and, thus, are exposed for easier contacting with electrical leads for connecting with an operating circuit.

An embodiment provides that a line of intersection of the housing longitudinal plane and the field guide body longitudinal plane coincides with a longitudinal axis of the housing, and/or wherein a line of intersection of the housing longitudinal plane and the coil arrangement longitudinal plane coincides with the longitudinal axis of the housing.

An embodiment provides that the magnetically inductive flow measuring probe comprises:

a measuring circuit for ascertaining a measurement voltage induced on the two measuring electrodes, wherein the measuring circuit is arranged in the housing interior and connected with the measuring electrode contact elements, especially mechanically and electrically separably, wherein the measuring circuit is arranged on a circuit board, wherein the circuit board has measuring electrode counter contact elements embodied complementary to the measuring electrode contact elements, wherein the measuring electrode counter contact elements form a plug-in connection with the measuring electrode contact elements.

An advantage of the wireless solution lies in, besides the reduced assembly steps, a simpler, less error-prone contacting of the measuring electrodes and a simpler assembly of the measuring circuit. It is sufficient then, in the arranging of the measuring circuit at the housing end section and at the measuring electrodes, to plug the measuring electrode counter contact elements on, or into, the measuring electrode contact elements. In this way, not only an electrical connection forms, but also a mechanical connection, which holds the circuit board in a desired mounted position.

An embodiment provides that the magnetically inductive flow measuring probe comprises:

an operating circuit for operating the coil arrangement, wherein the operating circuit is arranged in the housing interior and connected with the coil arrangement, especially mechanically and electrically separably, wherein the operating circuit is arranged on a circuit board, wherein the circuit board has coil counter contact elements embodied complementary to the coil contact elements, wherein the coil counter contact elements form a plug-in connection with the coil contact elements.

An advantage of this embodiment is, besides the reduced assembly steps, a simpler and less error-prone contacting of the coil arrangement and mounting of the operating circuit. It is sufficient then, in the arranging of the operating circuit at the coil arrangement, to plug the coil counter contact elements on, or into, the coil contact elements. In this way, not only an electrical connection is formed, but, instead, also a mechanical connection, which holds the circuit board in a desired mounted position.

In an embodiment, the operating circuit and the measuring circuit are arranged on exactly one circuit board and the circuit board is provided with the measuring electrode counter contact elements and coil counter contact elements, such that in the mounting of the circuit board the forming of the plug connections between measuring electrode contact elements and measuring electrode counter contact elements and between coil contact elements and coil counter contact elements occurs in a single assembly step.

An embodiment provides that the circuit board has two circuit board legs, with, in each case, a circuit board leg end section, wherein the circuit board legs extend from a circuit board main body in the direction of the front section of the housing, wherein the two measuring electrode counter contact elements are arranged, in each case, in a different one of the two circuit board leg end sections.

This embodiment has the advantage that the measuring circuit arranged on the circuit board is arrangeable in a housing section behind the means for producing the magnetic field and at the same time a contacting with the measuring electrodes, or measuring electrode contact elements, located in the housing end section can be implemented. This enables additionally an, as a whole, trimmer embodiment of the magnetically inductive flow measuring probe without bringing disadvantages in the mounting of the individual components in the production of the magnetically inductive flow measuring probe.

An embodiment provides that the two coil counter contact elements are arranged on the circuit board main body.

In an embodiment, supplementally, the two measuring electrode counter contact elements are arranged, in each case, in one of the two circuit board leg end sections. This embodiment has the advantage that the measuring electrodes and the coil arrangement can be connected with the measuring circuit and the operating circuit in a single assembly step—namely in the installing of the circuit board. This reduces the number of assembly steps and, thus, also the susceptibility for error in the mounting of the individual components.

An embodiment provides that the circuit board has two sides facing away from one another,
wherein the coil counter contact elements are arranged, in each case, on different sides of the circuit board, and/or
wherein the measuring electrode counter contact elements are arranged, in each case, on different sides of the circuit board.

This embodiment has the advantage that, thus, the angle β can be selected as small as possible, without the measuring electrode counter contact elements and the field guiding body legs interfering with one another.

An embodiment provides that the circuit board has two sides facing away from one another,
wherein the coil counter contact elements are arranged on same sides of the circuit board, and/or
wherein the measuring electrode counter contact elements are arranged on same sides of the circuit board.

An advantage of this embodiment lies in the resulting independence from tolerances of the circuit board thickness. For this reason, it is also advantageous that the coil counter contact elements and the measuring electrode counter contact elements are arranged on a shared side of the circuit board. In such case, the angles α and β are advantageously equal.

BRIEF DESCRIPTION OF THE DRAWINGS

The invention will now be explained in greater detail based on the appended drawing, the figures of which show as follows.

DETAILED DESCRIPTION

Figure 1:
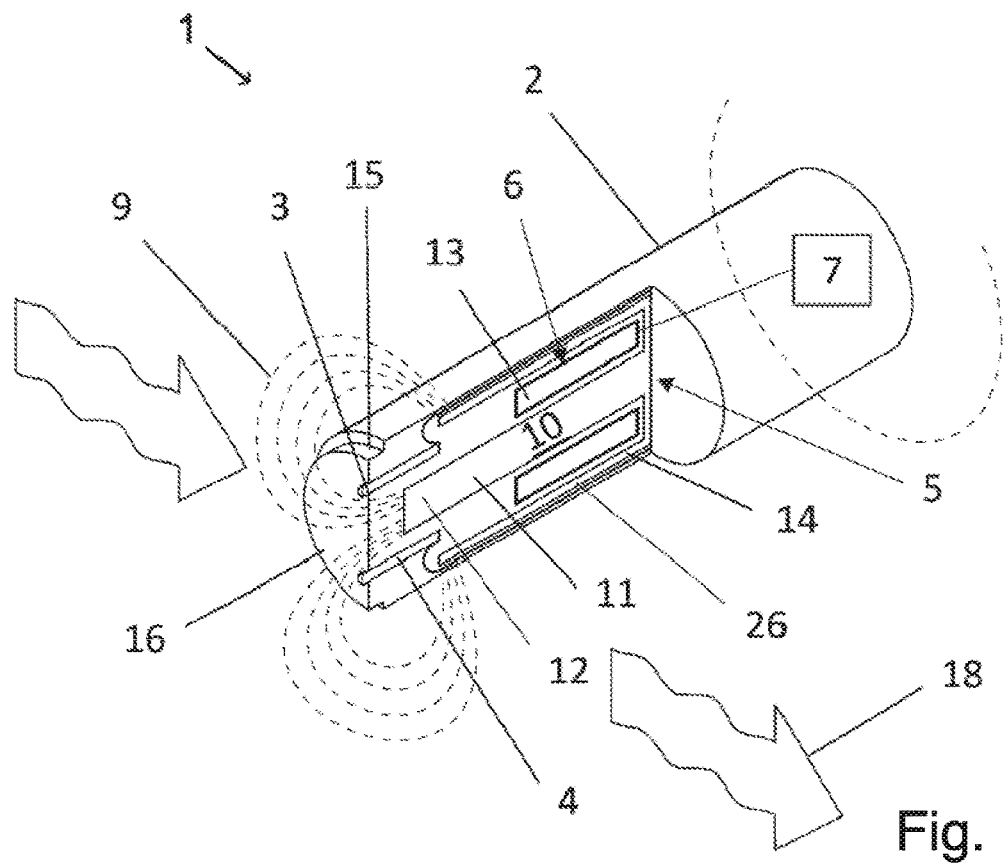
FIG. 1 shows a perspective and partially sectioned view of a magnetically inductive flow measuring probe according to the state of the art.

Based on the perspective and partially sectioned view of the FIG. 1, first, the measuring principle underlying the invention will be explained. A magnetically inductive flow measuring probe 1 includes an, in general, circularly cylindrical housing 2 having a predetermined outer diameter. The housing is fitted to the diameter of a bore, which is located in a wall of a pipeline 8 (not shown in FIG. 1, but shown in FIG. 6) and into which the magnetically inductive flow measuring probe 1 is fluid-tightly inserted. Flowing in the pipeline 8 is a flowable medium to be measured, into which the flow measuring probe 1 is immersed essentially perpendicularly to the flow direction of the medium, as shown by the wavy arrows 18. A housing end section 16 of the housing 2 protruding into the medium is fluid-tightly sealed with a front body 15 of insulating material. A means 5 arranged in the housing 2 for producing a magnetic field produces a magnetic field 9 passing through the end section and into the medium. A coil core 11 at least partially of a soft magnetic material arranged in the housing 2, or a pole shoe 12 located terminally on the coil core 11, ends at or in the vicinity of the housing end section 16. A field guideback 26 having a field guideback body 14, which surrounds the coil arrangement 6 and the coil core 11, is adapted to lead the magnetic field 9 extending out of the housing end section 16 back into the housing 2. The coil core 11, the pole shoe 12 and the field guideback body 14 are, in each case, field guide bodies 10, which together form a field guide arrangement. First and second galvanic measuring electrodes 3, 4 are arranged in the front body 15 and contact the medium. An electrical voltage induced on the measuring electrodes 3, 4 according to Faraday's law of induction can be read by means of a measuring circuit. The voltage is maximum, when the flow measuring probe is so installed into the pipeline that a plane defined by a straight line intersecting the two measuring electrodes 3, 4 and a longitudinal axis of the flow measuring probe extends perpendicularly to the flow direction 18, or to the longitudinal axis of the pipeline. An operating circuit 7 is electrically connected with the coil arrangement 6, especially with the coil 13, and is adapted to impress on the coil 13 a clocked excitation signal, in order, thus, to produce a clocked magnetic field 9.

Figure 2:
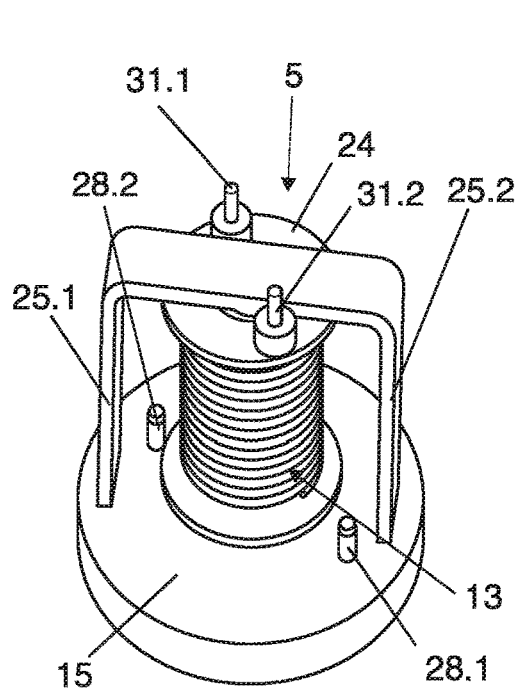
FIG. 2 shows a perspective view of a first embodiment of the magnetically inductive flow measuring probe of the present disclosure.

FIG. 2 shows a perspective view of a part of a first embodiment of the magnetically inductive flow measuring probe of the invention. Shown is a front body 15 with arranged measuring electrodes and the measuring electrode contact elements 28.1, 28.2 of the two measuring electrodes. The measuring electrode contact elements 28.1, 28.2 and the measuring electrodes can be embodied as a number of parts or as single pieces. The measuring electrode contact elements 28.1, 28.2 can also be formed by end sections of the measuring electrodes. Arranged on a media far side of the front body 15 is a means 5 for producing a magnetic field passing through the front body 15. The means 5 for producing the magnetic field includes a coil arrangement of a coil 13 and a coil support 24. Coil 13 is composed of a coil wire wound on the coil support 24. The ends of the coil wire are, in each case, connected with coil contact elements 31.1, 31.2 or form, in each case, the coil contact elements 31.1, 31.2. The coil contact elements 31.1, 31.2 extend essentially in parallel with a longitudinal axis of the housing. Additionally, the means 5 for producing the magnetic field includes a field guide body composed of two field guide body legs 25.1, 25.2 and a coil core, which extends through an opening of the coil support 24. The two field guide body legs 25.1, 25.2 are connected with an end of the coil core. The illustrated embodiment shows a monolithic field guide body. Alternatively, the field guide body can be made of a plurality of parts, i.e. coil core and field guide body legs 25 are individual components, which are assembled and together form the field guide body. The coil support 24 and the front body 15 can be separate parts or they can be formed monolithically.

Figure 3:
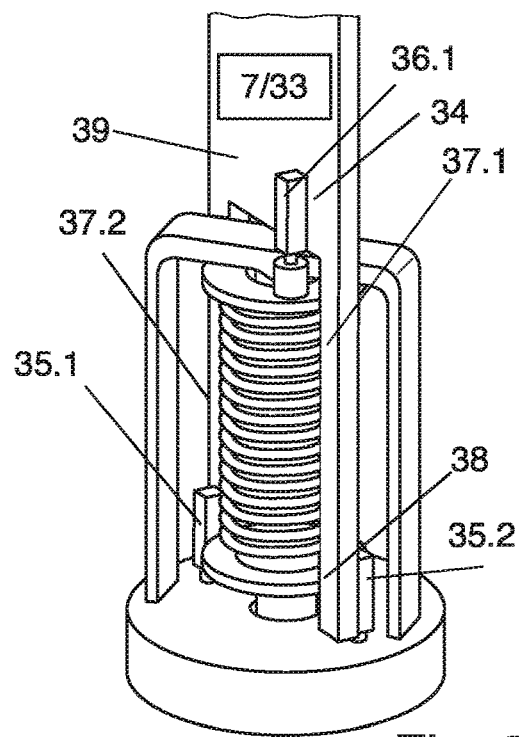
FIG. 3 shows a perspective view of the first embodiment with arranged circuit board.

FIG. 3 shows a perspective view of a part of the first embodiment with applied circuit board. In addition to the features of FIG. 2, the shown part of the magnetically inductive flow measuring probe of the invention includes supplementally a circuit board 34, which has two coil counter contact elements 36.1, 36.2 (36.2 is hidden in FIG. 3 by the circuit board) and two measuring electrode counter contact elements 35.1, 35.2. Circuit board 34 includes two circuit board legs 37.1, 37.2, which extend from a circuit board main body 39 in the direction of the front body. The circuit board legs 37.1, 37.2 have, in each case, a circuit board leg end section 38, where, in each case, a measuring electrode counter contact element 35.1, 35.2 is arranged. The coil counter contact elements 36.1, 36.2 are arranged on the circuit board main body 39. In the illustrated embodiment, the coil counter contact elements 36.1, 36.2 form a plug-in connection with the coil contact elements and the measuring electrode counter contact elements 35.1, 35.2 form a plug-in connection with the measuring electrode contact elements. Arranged on the circuit board 34 is an operating circuit 7 and a measuring circuit 33, wherein the operating circuit 7 is electrically connected with the coil via the coil counter contact elements 36.1, 36.2 and the measuring circuit 33 is electrically connected with the measuring electrodes via the measuring electrode counter contact elements 35.1, 35.2.

Figure 4:
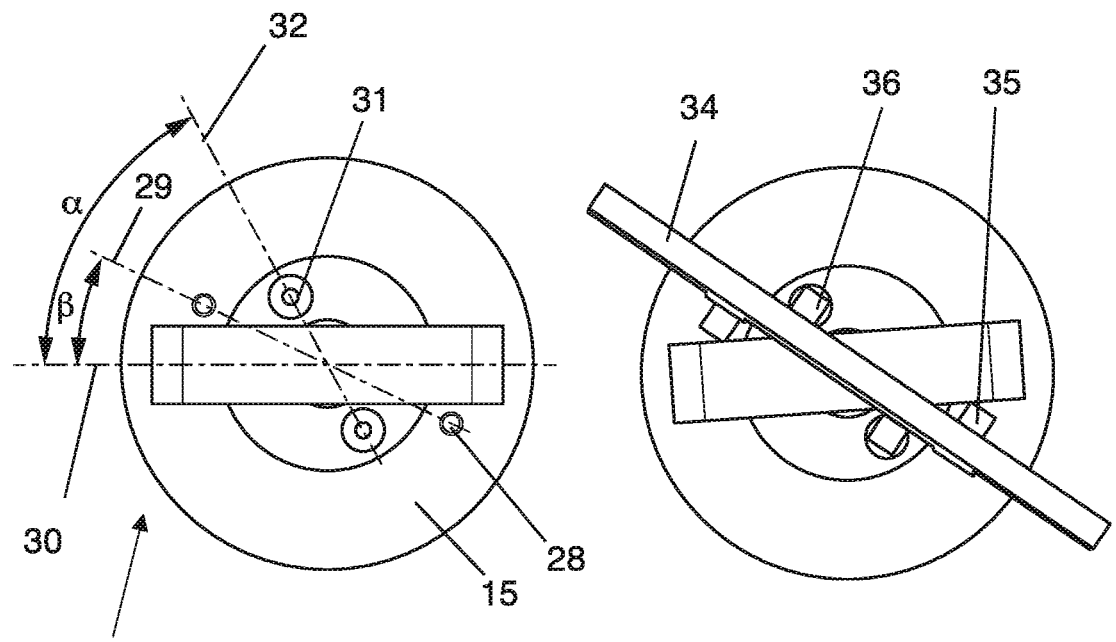
FIG. 4 shows a plan view of an orthogonal projection of the measuring electrodes and the field guide body onto a cross sectional plane perpendicular to the longitudinal axis of the housing of the first embodiment.

FIG. 4 shows a first plan view of an orthogonal projection of the measuring electrodes and the field guide body onto a cross sectional plane perpendicular to the longitudinal axis of the housing of the first embodiment. The dot dashed lines represent, respectively, the housing longitudinal plane 29, the field guide body longitudinal plane 30 and the coil arrangement longitudinal plane 32. Between the housing longitudinal plane 29 and the field guide body longitudinal plane 30 is an angle $\beta$. According to the invention, $0°<\beta\leq90°$, especially $10°\leq\beta\leq60°$ and preferably $25°\leq\beta\leq45°$. The angle $\beta$ of the illustrated embodiment is about 35°. Between the field guide body longitudinal plane 30 and the coil arrangement longitudinal plane 32 is an angle $\alpha$, wherein $0°\leq\alpha\leq90°$, especially $\alpha\geq50°$ and preferably $\alpha\geq75°$. The angle $\beta$ is so selected that the measuring electrode contact elements 28 are not hidden by the field guide body and, at the same time, the magnetic field produced between the measuring electrodes is sufficiently large, in order to induce in the medium a measurement voltage detectable by means for ascertaining the induced measurement voltage. The first and second plan views differ in that in the second plan view a circuit board 34 with measuring electrode counter contact elements 35 and coil counter contact elements 36 is plugged onto the front body 15, in order that the coil contact elements 31 and measuring electrode contact element 28 are electrically connected, respectively, with the operating circuit 7 and the measuring circuit 33. The two coil counter contact elements 36 are arranged on different sides of the circuit board 34. The same is true also for the arrangement of the two measuring electrode counter contact elements 35.

Figure 5:
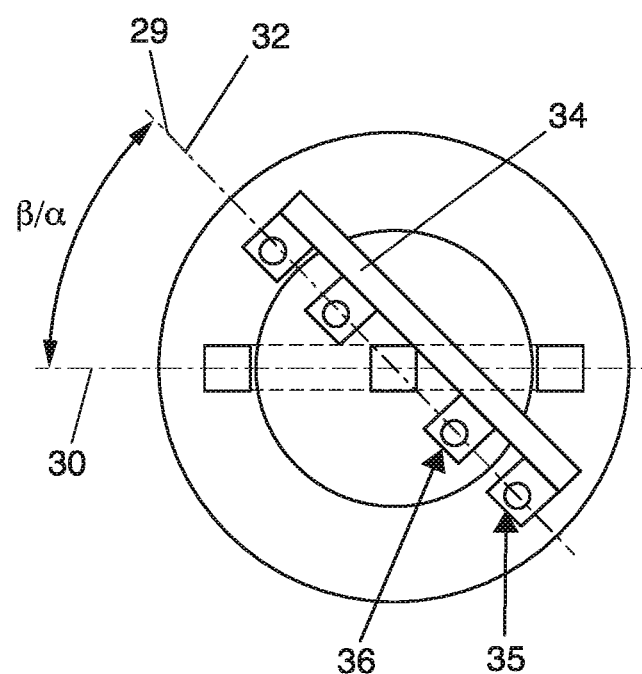
FIG. 5 shows a plan view of an orthogonal projection of the measuring electrodes and the field guide body onto a cross sectional plane perpendicular to the longitudinal axis of the housing of a second embodiment.

FIG. 5 shows a plan view of an orthogonal projection of the measuring electrodes and the field guide body on a cross sectional plane perpendicularly to the longitudinal axis of the housing for a second embodiment. The dot dashed lines represent, respectively, the housing longitudinal plane 29, the field guide body longitudinal plane 30 and the coil arrangement longitudinal plane 32. Between the housing longitudinal plane 29 and the field guide body longitudinal plane 30 is an angle $\beta$. According to the invention, $0°<\beta\leq90°$, especially $10°\leq\beta\leq60°$ and preferably $25°\leq\beta\leq45°$. Between the field guide body longitudinal plane 30 and the coil arrangement longitudinal plane 32 is an angle $\alpha$, wherein $0°\leq\alpha\leq90°$, especially $\alpha\geq50°$ and preferably $\alpha\geq75°$. In the illustrated embodiment, the angles $\alpha$ and $\beta$ are selected equal, in order to achieve an independence of circuit board tolerance, especially circuit board thickness. For such purpose, also two measuring electrode counter contact elements 35 and two coil counter contact elements 36 are arranged on a shared side of the circuit board 34.

Figure 6:
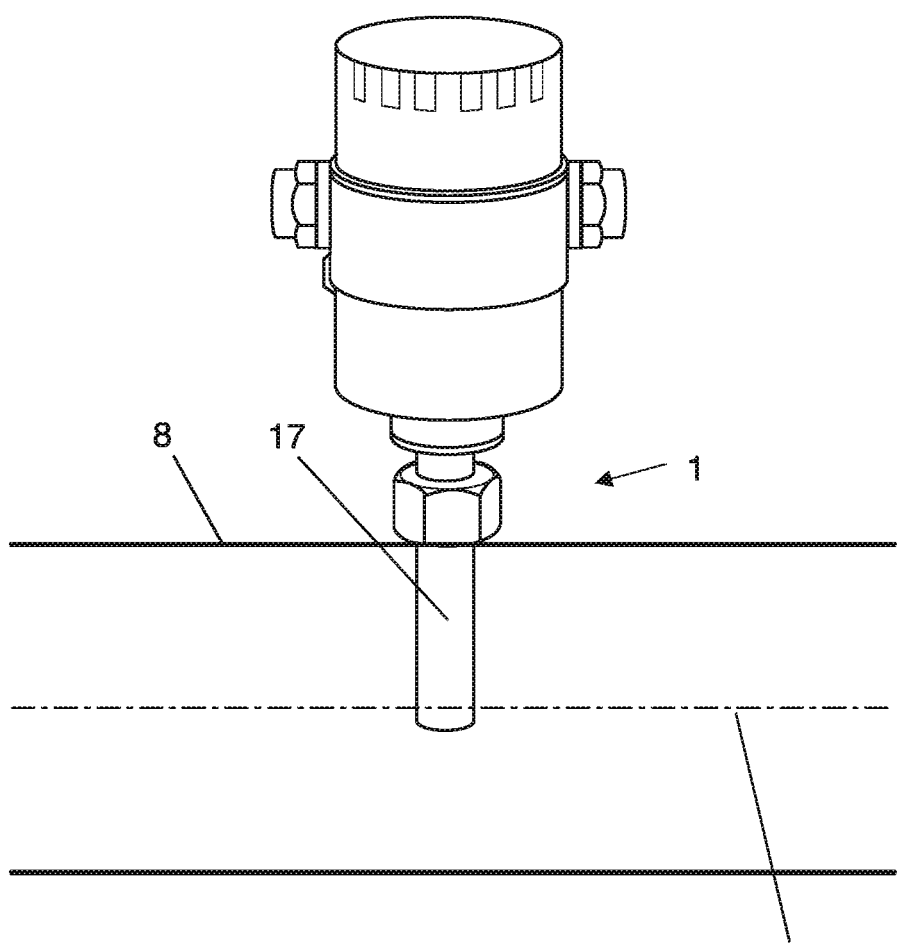
FIG. 6 shows a schematic view of the magnetically inductive flow measuring probe of the present disclosure in a pipeline.

FIG. 6 shows a schematic view of a measuring setup with a magnetically inductive flow measuring probe 1 of the invention inserted in a pipeline 8 having a longitudinal axis 21. A medium-contacting section of the housing is embodied electrically conductively and arranged as reference electrode 17.

The invention claimed is:

1. A magnetically inductive flow measuring probe for insertion into an opening of a pipeline flowed through by a flowable medium and for ascertaining a flow-velocity-dependent measured variable of a flowable medium, the magnetically inductive flow measuring probe comprising:
a housing that is adapted to be exposed to the medium, the housing having:
a housing end section; and
a housing case that encloses a housing interior;
two measuring electrodes arranged in the housing end section for forming a galvanic contact with the medium and for sensing a voltage induced in the flowing medium, wherein each of the two measuring electrodes has a measuring electrode contact element protruding inwardly into the housing interior, wherein the two measuring electrode contact elements are arranged such that a housing longitudinal plane extends through the two measuring electrode contact elements;
a means for producing a magnetic field that passes through the housing end section, wherein the means for producing the magnetic field is arranged in the housing interior and includes a coil arrangement and a field guide body, wherein the coil arrangement includes an opening, and the field guide body includes a coil core that extends through the opening in the coil arrangement,
wherein the field guide body includes two field guide body legs connected with the coil core and extending to a front section of the housing and adapted to serve as a field guideback,
wherein orthogonal projections of the measuring electrodes and the field guide body onto a cross sectional plane perpendicular to a longitudinal axis of the housing are disjoint.

2. The magnetically inductive flow measuring probe as claimed in claim 1,
wherein a field guide body longitudinal plane extends through the two field guide body legs, and
wherein the housing longitudinal plane and field guide body longitudinal plane define an angle $\beta$ with $0°<\beta\leq90°$.

3. The magnetically inductive flow measuring probe as claimed in claim 2,
wherein the field guide body legs are, at least partially, strip shaped, and/or wherein the field guide body has exactly two mutually perpendicular mirror planes, and one of the two mirror planes and the field guide body longitudinal plane coincide.

4. The magnetically inductive flow measuring probe as claimed in claim 2,
wherein the coil arrangement includes a coil, a coil support and two coil contact elements,
wherein the coil contact elements are connected with a coil wire wound on the coil support and forming the coil,
wherein the two coil contact elements are arranged on the coil support on a side far from the housing end section,
wherein a coil arrangement longitudinal plane extends through the two coil contact elements,
wherein a field guide body longitudinal plane extends through the two field guide body legs, and
wherein the field guide body longitudinal plane and the coil arrangement longitudinal plane define an angle α with $0° \leq α \leq 90°$.

5. The magnetically inductive flow measuring probe as claimed in claim 4,
wherein a line of intersection of the housing longitudinal plane and the field guide body longitudinal plane coincides with a longitudinal axis of the housing, and/or
wherein a line of intersection of the housing longitudinal plane and the coil arrangement longitudinal plane coincides with the longitudinal axis of the housing.

6. The magnetically inductive flow measuring probe as claimed in claim 1, further comprising:
a measuring circuit for ascertaining a measurement voltage induced on the two measuring electrodes,
wherein the measuring circuit is arranged in the housing interior and separably connected with the measuring electrode contact elements mechanically and electrically, and
wherein the measuring circuit is arranged on a circuit board and the circuit board has measuring electrode counter contact elements embodied complementary to the measuring electrode contact elements and embodied to form a plug-in connection with the measuring electrode contact elements.

7. The magnetically inductive flow measuring probe as claimed in claim 6, further comprising:
an operating circuit for operating the coil arrangement,
wherein the operating circuit is arranged in the housing interior and separably connected with the coil arrangement mechanically and electrically,
wherein the operating circuit is arranged on a circuit board, and the circuit board has coil counter contact elements embodied complementary to the coil contact elements, and
wherein the coil counter contact elements form a plug-in connection with the coil contact elements.

8. The magnetically inductive flow measuring probe as claimed in claim 7,
wherein the circuit board has two circuit board legs with, in each case, a circuit board leg end section,
wherein the circuit board legs extend from a circuit board main body in a direction of the front section of the housing,
wherein the two measuring electrode counter contact elements are arranged, in each case, in a different one of the two circuit board leg end sections.

9. The magnetically inductive flow measuring probe as claimed in claim 8,
wherein the two coil counter contact elements are arranged on the circuit board main body.

10. The magnetically inductive flow measuring probe as claimed in claim 9,
wherein the circuit board has two sides facing away from one another,
wherein the coil counter contact elements are arranged, in each case, on different sides of the circuit board, and/or
wherein the measuring electrode counter contact elements are arranged, in each case, on different sides of the circuit board.

11. The magnetically inductive flow measuring probe as claimed in claim 9,
wherein the circuit board has two sides facing away from one another,
wherein the coil counter contact elements are arranged, in each case, on same sides of the circuit board, and/or
wherein the measuring electrode counter contact elements are arranged, in each case, on same sides of the circuit board.

* * * * *